United States Patent
Mieglitz et al.

[11] Patent Number: 6,070,927
[45] Date of Patent: Jun. 6, 2000

[54] CONTAINER IN A MOTOR VEHICLE FOR STORING DRINKS AND/OR FOOD

[76] Inventors: Hans-Helmut Mieglitz, Moosweg 16D, D-40789, Monheim; Alfred Mai, Walkerweg 4, D-42499, Hückeswagen; Andreas Gross, Lahnstrasse 16, D-42697, Solingen, all of Germany

[21] Appl. No.: 09/042,756

[22] Filed: Mar. 17, 1998

[51] Int. Cl.[7] .................................................... B60N 3/12
[52] U.S. Cl. ..................................... 296/37.12; 296/37.8
[58] Field of Search .............................. 296/37.8, 37.12; 224/282, 926; 248/311.2

[56] References Cited

U.S. PATENT DOCUMENTS

| | | | |
|---|---|---|---|
| 4,545,211 | 10/1985 | Gaus | 296/37.6 |
| 4,783,037 | 11/1988 | Flowerday | 248/311.2 |
| 4,928,865 | 5/1990 | Lorence et al. | 248/311.2 |
| 4,953,772 | 9/1990 | Phifer | 224/282 |
| 5,289,962 | 3/1994 | Tull et al. | 296/37.12 |
| 5,297,709 | 3/1994 | Dykstra et al. | |
| 5,316,368 | 5/1994 | Arbisi | 248/311.2 |
| 5,588,480 | 12/1996 | Armanno, Sr. | 248/311.2 |
| 5,701,754 | 12/1997 | Choi et al. | 296/37.12 |

FOREIGN PATENT DOCUMENTS

| | | |
|---|---|---|
| 35 12 808 A1 | 10/1986 | Germany . |
| 37 39 151 A1 | 7/1988 | Germany . |
| 37 01 848 A1 | 8/1988 | Germany . |

*Primary Examiner*—D. Glenn Dayoan
*Assistant Examiner*—Lori L. Coletta
*Attorney, Agent, or Firm*—Harness, Dickey & Pierce, P.L.C.

[57] ABSTRACT

A beverage container for a motor vehicle is provided for. The beverage container holder is located in a vehicle glove compartment. The beverage container holder is pivotally attached to the glove compartment cover and a side wall of the glove compartment so that the bottom of the beverage container holder remains horizontal when the cover is in a closed position. The beverage container holder also has a system for allowing cool air from the vehicle's ventilation system into the glove compartment through an air duct for the purpose of cooling items placed in the beverage container holder. An aperture located in a side wall of the glove compartment cover allows cooling air to be circulated when the glove compartment cover is in a closed position. When the glove compartment cover is open, the side wall of the glove compartment cover prevents cooling air from being circulated within the glove compartment.

8 Claims, 4 Drawing Sheets

CONTAINER IN A MOTOR VEHICLE FOR STORING DRINKS AND/OR FOOD

BACKGROUND OF THE INVENTION

The invention relates to a container in a motor vehicle for storing drinks and/or food.

German offenlegungsschrift 35 12 808 describes a can holder in a motor vehicle in a glove compartment which can be closed by a swing-action cover, said holder having a retaining plate in which a circular-cylindrical can-receiving depression is formed, it being possible for the retaining plate to be fitted on the driver-side edge of the swing-action cover such that, when said cover is open, the retaining plate is aligned at least approximately horizontally. When the swing-action cover is swung shut, said retaining plate moves over an arc, with the result that an opened can which has been set down on the retaining plate has to be removed from the latter before the cover is swung shut, in order to avoid spilling of the contents.

A further can holder in a motor vehicle is described in U.S. Pat. No. 5,297,709. This can holder is designed such that it can be drawn out in the manner of a drawer once it has been swung down into a horizontal position. It is only in the open state that this can holder is suitable for receiving a drinks can, and the latter thus always has to be removed from the holder before the holder is pushed in and swung up.

For storing drinks and/or food in containers, such as glove compartments, stowage boxes or tunnel console housings with stowage and set-down means on a swing-out cover, it is desirable for it to be possible for food and/or drinks which have/has been opened and set down on the swung-out cover to be returned into the storage container without the contents being spilled, the intention being to ensure that opened drinks and/or food are/is stored without any risk of a mess being made both when the container is open and when it is closed. Furthermore, it is desirable for cooling to be provided in the storage container.

BRIEF SUMMARY OF THE INVENTION

Taking the first part of this problem as departure point, a container in a motor vehicle, according to the invention, has a pivotable drinks-can holder which is arranged on a container cover which can be swung in and out, and has a kinematic guidance arrangement which keeps the drinks-can holder horizontal during the swinging-in and swinging-out operations.

This kinematic guidance arrangement means that a cup or a bottle or a drinks can which has been set down on the drinks-can holder always remains horizontal during the swinging-in and swinging-out operations, with the result that the contents cannot be spilled and any risk of a mess being made is thus also ruled out.

Preferably, the drinks-can holder may be arranged in a glove compartment, which can be swung downward about a horizontal axis, it being possible for the kinematic guidance arrangement for the drinks-can holder to be realized such that, on its side which is directed away from a hinge of the glove-compartment cover, the drinks-can holder is articulated to the inside of the glove-compartment cover, and a pin, which is spaced apart from the articulation of the drinks-can holder to the glove-compartment cover, engages through a slot in a side wall of the glove-compartment cover and engages in a slot-like guide in an adjacent side wall of the glove compartment, these slots being arranged at an angle with respect to one another such that the drinks-can holder is kept horizontal during the swinging-in and swinging-out operations.

Furthermore, the container may be connected to a system for feeding cool air for the purpose of cooling drinks and/or food stored in said container. This system for feeding cool air may be connected to the extensive air-channeling system which is present anyway in the region of the instrument panel of a motor vehicle, and it may preferably be provided with a means for switching over the air feed between cool outside air and cool air which is produced by an air-conditioning system.

Although it is known from DE 37 01 848 to feed cool outside air to a cool box in the winter, even when heated air is being fed to the motor-vehicle interior, while in the summer the container is fed cool air which is produced by an air-conditioning system, this container does not have a means on which opened drinks can be set down, with the result that it is not possible here either for the set-down drinks to be returned into the cool box.

In order that one is not exposed to an uncomfortable blast of cool air when the container is opened, it is possible to provide, on the container, means for shutting off the cool air when said container is opened. Although this possibility is described in DE 37 39 151 A1, it is complicated to fit and likewise does not provide for any means on which opened drinks can be set down or for return of the set-down drinks into the container.

The cool air may preferably be fed to a glove compartment in an instrument panel of the motor vehicle, but it is also possible for this operation to be carried out in stowage boxes, or tunnel console housings with stowage means, which are arranged at some other location in the motor vehicle.

If the cool air is fed to the glove compartment in the instrument panel, the system for feeding cool air may preferably open into an opening in a side wall of the glove compartment, and a swing-out cover of the glove compartment may have a side wall which is adjacent to the side wall of the glove compartment, can be moved parallel thereto, conceals the opening when the container is in the open position and has an opening which, when the container is in the closed position, is in alignment with the opening in the side wall of the glove compartment.

This arrangement makes it possible, without high outlay, to branch off cool air from the air-cooling system in the region of the instrument panel and to feed this air to the glove compartment when the swing-out cover is in the closed position, this feed of cool air being shut off when the glove-compartment cover is in the open position.

BRIEF DESCRIPTION OF THE DRAWINGS

The invention is explained in more detail hereinbelow with reference to an exemplary embodiment illustrated in the drawing, in which.

DETAILED DESCRIPTION OF THE PREFERRED EMBODIMENT

Figure 1:
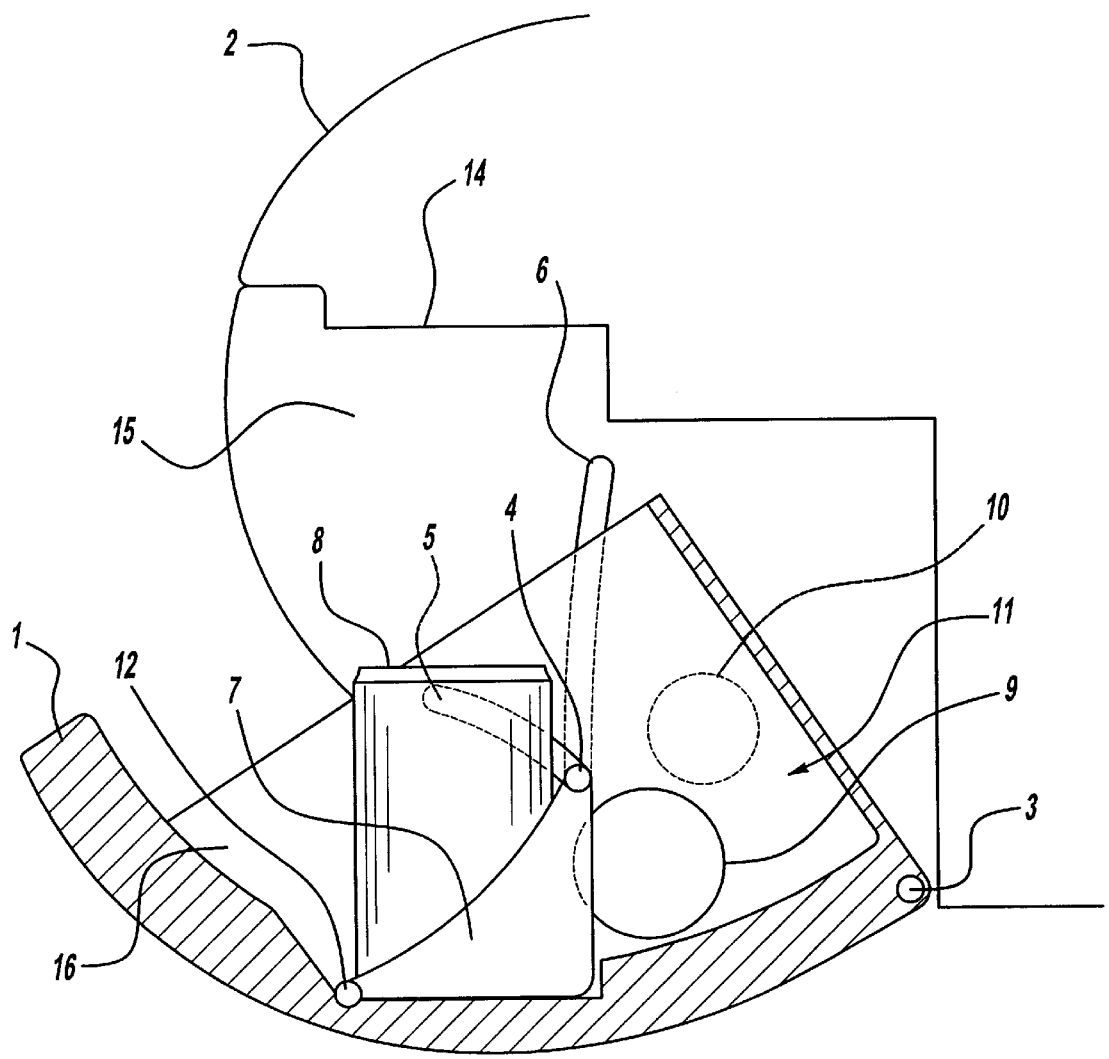
FIG. 1 shows a schematic sectional view of a glove compartment with the glove-compartment cover swung out to the full extent and the drinks-can holder arranged thereon.

A glove compartment 14 is arranged in the usual manner in an instrument panel 2. This glove compartment 14 can be closed by means of a glove-compartment cover 1. The glove-compartment cover 1 is articulated by means of a hinge 3 in the bottom rear region of the glove compartment 14, with the result that, when opened, the glove-compartment cover 1 swings down into the position which is illustrated in FIG. 1. In a lateral region of a glove-compartment stowage area 11, which is formed above the glove-compartment cover 1, a drinks-can holder 7 is mounted pivotably by means of a hinge-like articulation 12. This hinge 12 is located on that side of the drinks-can holder 7 which is directed away from the hinge 3 of the glove-compartment cover 1. A drinks can 8 is illustrated standing on the drinks-can holder 7. A horizontal pin 4, which is spaced apart from the hinge 12 and is arranged on that side of the drinks-can holder 7 which is directed toward the hinge 3 of the glove-compartment cover 1, engages through a slot 5 in a side wall 16 of the glove-compartment cover 1 and also engages in a slot-like guide 6 in a side wall 15 of the glove compartment 14.

An air duct 13 leads to the side wall 15 and terminates in an opening 10 of the side wall 15. A corresponding opening 9 is arranged in the side wall 16 of the glove-compartment cover 1 and forms an outlet nozzle. In the position which is illustrated in FIG. 1, the opening 9 in the side wall 16 of the glove-compartment cover 1 has been pivoted out of the region of the opening 10 in the side wall 15 of the glove compartment 14, with the result that the opening 10 is closed by the side wall 16 of the glove-compartment cover 1 and the cool-air feed to the glove compartment 14 and/or to the glove-compartment stowage area 11 is interrupted.

The air duct 13 is connected, in a manner which is not illustrated, to an air-cooling system in the region of the instrument panel 2 and may have a means for switching over the air feed 17 in order for cool outside air to be fed to the glove-compartment stowage area 11 when the vehicle heating system is switched on or for cool air which is produced by an air-conditioning system to be fed to the stowage area when said system is switched on.

Figure 2:
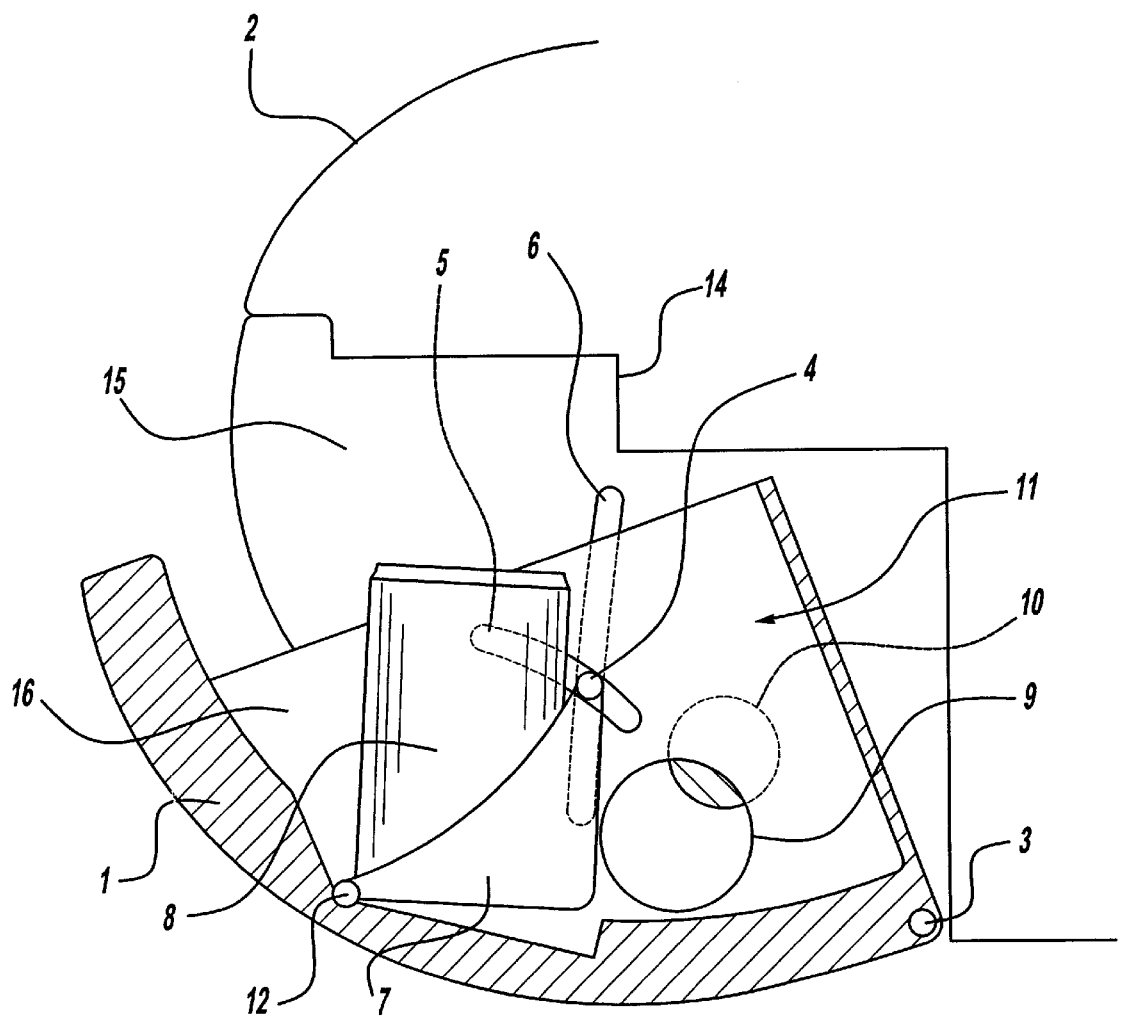
FIG. 2 shows a schematic sectional view according to FIG. 1 with the glove-compartment cover swung in halfway.
Figure 3:
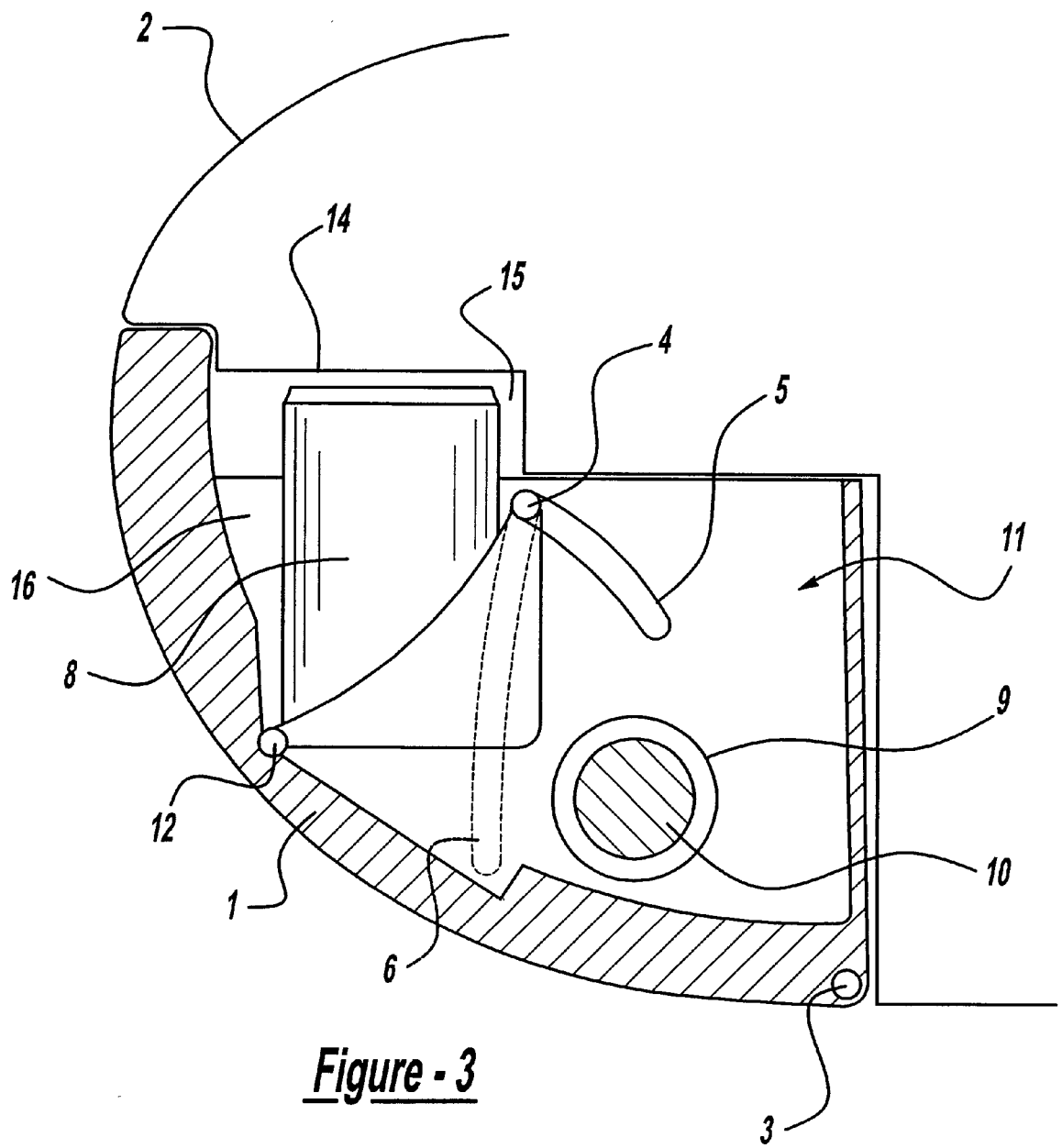
FIG. 3 shows a schematic sectional view according to FIG. 1 with the glove-compartment cover fully closed.
Figure 4:
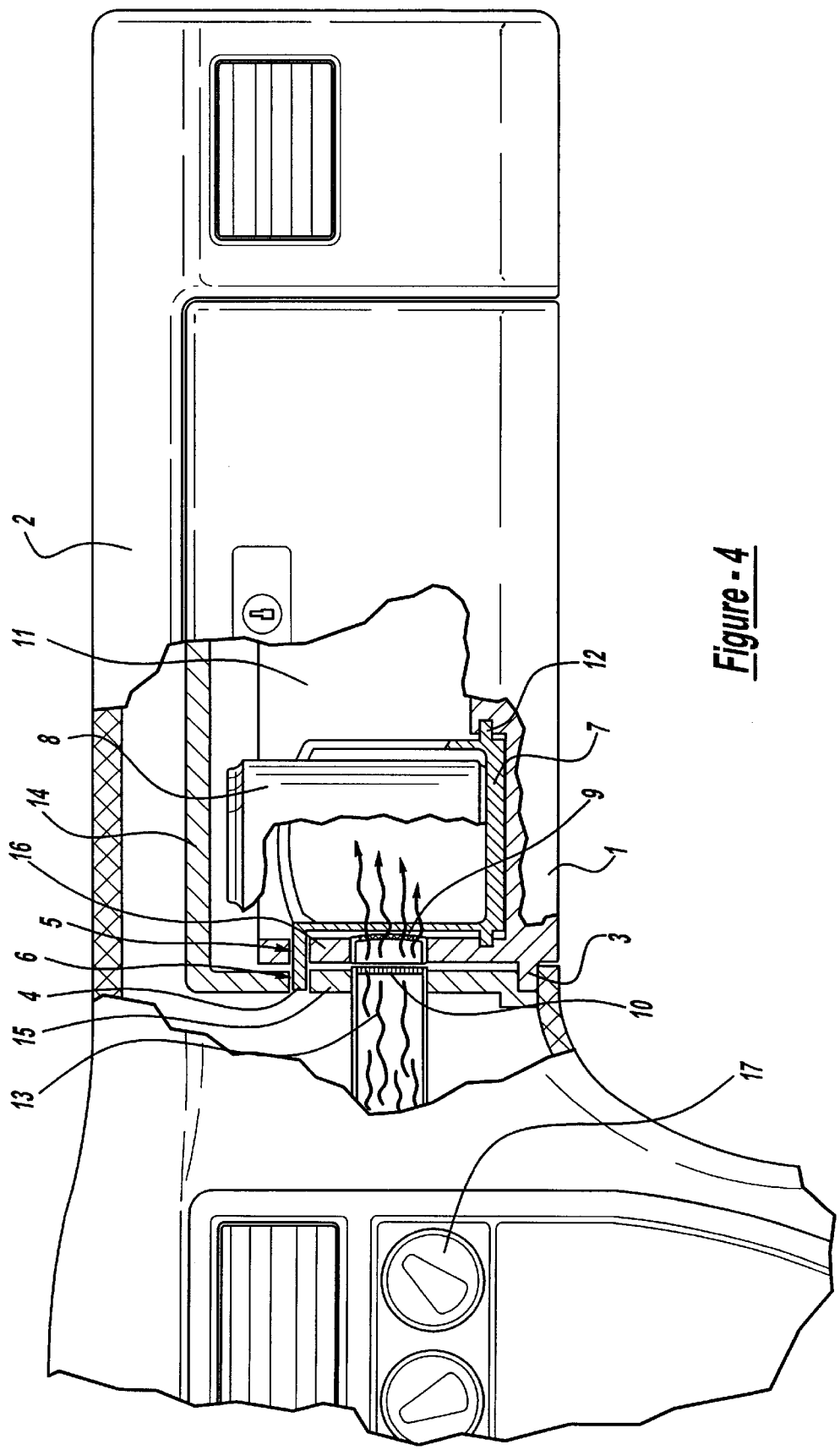
FIG. 4 shows a schematic front view of an instrument panel with a glove compartment and drinks-can holder illustrated in the partially broken-away state.

When the glove-compartment cover 1 is swung up, the drinks-can holder 7 is always guided horizontally, as can be seen from FIGS. 2 and 3, by the pin 4, which engages through the slot 5 and into the slot-like guide 6 with the result that, even when the drinks can 8 has been opened, its contents are not spilled during the swinging-open and swinging-shut operations.

What is claimed is:

1. A container for beverage cans in a motor vehicle, having a pivotable beverage-can holder which is arranged on a container cover which can be swung in and out, and having a kinematic guidance arrangement which keeps the beverage-can holder horizontal during the swinging-in and swinging-out operations.

2. The container as claimed in claim 1, wherein the beverage-can holder is arranged on a glove-compartment cover, which can be swung downward about a horizontal axis.

3. The container as claimed in claim 2, wherein the beverage-can holder is articulated to the inside of the glove-compartment cover, and a pin, which is spaced apart from the articulation of the beverage-can holder to the glove-compartment cover, engages through a slot in a side wall of the glove-compartment cover and engages in a slot-like guide in an adjacent side wall of the glove compartment, these slots being arranged at an angle with respect to one another such that the beverage-can holder is kept horizontal during the swinging-in and swinging-out operations.

4. The container as claimed in claim 1, which further comprises a system for feeding cool air for the purpose of cooling one of a drink and food stored in said container.

5. The container as claimed in claim 4, which further comprises means for switching over the air feed between cool outside air and cool air which is produced by an air-conditioning system.

6. The container as claimed in claim 4, which further comprises means for shutting off the cool air when the container is opened.

7. The container as claimed in claim 4 wherein the cool air is fed to a glove compartment in an instrument panel.

8. The container as claimed in claim 7, wherein the system for feeding cool air includes an opening in a side wall of the glove compartment communicating with the cool air feed, and an opening in a side wall of a swing-out cover of the glove compartment, the side wall of the cover being adjacent to the side wall of the glove compartment and movable parallel thereto, the side wall of the cover concealing the opening of the glove compartment when the container is in the open position, and when the container is in the closed position, the opening in the side wall of the cover being in substantial alignment with the opening in the side wall of the glove compartment.

\* \* \* \* \*